United States Patent
Mitchel et al.

(10) Patent No.: US 7,668,139 B2
(45) Date of Patent: Feb. 23, 2010

(54) MOBILE HANDOVER UTILIZING MULTICAST IN A MULTI-PROTOCOL LABEL SWITCHING (MPLS)-BASED NETWORK

(75) Inventors: Henry Mitchel, Wayne, NJ (US); James (JR-Shian) Tsai, Beaverton, OR (US); Gerald Lebizay, Las Vegas, NV (US); Prakash Iyer, Beaverton, OR (US); Asher Altman, Bedford, MA (US); Farid Adrangi, Lake Oswego, OR (US); Alan Stone, Morristown, NJ (US)

(73) Assignee: Intel Corporation, Santa Clara, CA (US)

( * ) Notice: Subject to any disclaimer, the term of this patent is extended or adjusted under 35 U.S.C. 154(b) by 703 days.

(21) Appl. No.: 11/088,142

(22) Filed: Mar. 23, 2005

(65) Prior Publication Data

US 2006/0215607 A1     Sep. 28, 2006

(51) Int. Cl.
*H04W 4/00*     (2006.01)
*H04W 36/00*    (2006.01)

(52) U.S. Cl. .............. 370/331; 455/438; 455/442; 455/443

(58) Field of Classification Search ......... 370/331–334; 455/436–444
See application file for complete search history.

(56) References Cited

U.S. PATENT DOCUMENTS

| | | | |
|---|---|---|---|
| 6,587,457 B1 | 7/2003 | Mikkonen | |
| 6,754,224 B1 * | 6/2004 | Murphy | 370/432 |
| 6,985,463 B1 * | 1/2006 | Wright et al. | 370/331 |
| 7,085,494 B2 | 8/2006 | Boroditsky et al. | |
| 7,277,709 B2 * | 10/2007 | Vadgama | 455/453 |
| 7,283,465 B2 * | 10/2007 | Zelig et al. | 370/219 |
| 7,299,052 B2 * | 11/2007 | Ji et al. | 455/452.1 |
| 2004/0141491 A1 * | 7/2004 | Takei et al. | 370/349 |
| 2004/0192309 A1 * | 9/2004 | Watanabe et al. | 455/439 |
| 2006/0233137 A1 * | 10/2006 | Dantu et al. | 370/331 |
| 2006/0251417 A1 * | 11/2006 | Boroditsky et al. | 398/45 |

FOREIGN PATENT DOCUMENTS

| | | |
|---|---|---|
| EP | 1 437 868 A2 | 7/2004 |
| WO | 2006/102650 A1 | 9/2006 |

OTHER PUBLICATIONS

International Application No. PCT/US2006/011007, International Search Report and Written Opinion.
Karim, EL M., et al., "Simultaneous Bindings for Mobile IPv6 Fast Handoffs", *XP-002325023*, Mobile IP Working Group,(2002),1-14.
OOMS, D. , et al., "Framework for IP Multicast in MPLS", *XP-002251077*, Network Working Group,(2000),28.

(Continued)

*Primary Examiner*—Ronald Abelson (57) ABSTRACT

Methods and devices are disclosed for communicating in a wireless network using multi-protocol label switching (MPLS). A network service node is configured to send identical packets substantially simultaneously to each of a serving network access station and one or more target network access stations via two or more respective MPLS tunnels in response to a handoff trigger message. Additional embodiments and variations are also disclosed.

8 Claims, 5 Drawing Sheets

OTHER PUBLICATIONS

Wu, Liwen, et al., "MPLS Multicast Traffic Engineering", *XP-002251076,* Network Working Group,(1999),1-11.

Xie, Kaiduan, et al., "Support of Micro-Mobility in MPLS-based Wireless Access Network", *IEEE,* (2003),1242-1247.

"International Preliminary Report on Patentability for PCT Patent Application No. PCT/US2006/011007, mailed Oct. 4, 2007, 8 Pages."

Zahid Ghadialy, "Handover principle and concepts", UMTS Tutorial: Handover principle and concepts, dated Jul. 2, 2005, 9 pages.

* cited by examiner

MOBILE HANDOVER UTILIZING MULTICAST IN A MULTI-PROTOCOL LABEL SWITCHING (MPLS)-BASED NETWORK

BACKGROUND OF THE INVENTION

It is becoming more important to be able to provide telecommunication services to subscribers which are relatively inexpensive as compared to cable and other land line technologies. Further, the increased use of mobile applications has resulted in much focus on developing wireless systems capable of delivering large amounts of data at relatively high speeds.

In development of mobile wireless broadband networks an ongoing issue is how to address mobile handover for a mobile station to switch between a serving network access station and a target network access station with low latency and/or low packet loss.

BRIEF DESCRIPTION OF THE DRAWING

Aspects, features and advantages of embodiments of the present invention will become apparent from the following description of the invention in reference to the appended drawing in which like numerals denote like elements and in which.

DETAILED DESCRIPTION OF THE INVENTION

While the following detailed description may describe example embodiments of the present invention in relation to wireless networks utilizing Orthogonal Frequency Division Multiplexing (OFDM) modulation, the embodiments of present invention are not limited thereto and, for example, can be implemented using other modulation and/or coding schemes where suitably applicable. Further, while example embodiments are described herein in relation to handover for mobile broadband wireless metropolitan area networks (WMANs), the invention is not limited thereto and can be applied to other types of wireless networks where similar advantages may be obtained. Such networks specifically include, if applicable, wireless local area networks (WLANs), wireless personal area networks (WPANs) and/or wireless wide area networks (WWANs) such a cellular networks and the like.

The following inventive embodiments may be used in a variety of applications including transmitters and receivers of a radio system, although the present invention is not limited in this respect. Radio systems specifically included within the scope of the present invention include, but are not limited to, network interface cards (NICs), network adaptors, mobile stations, base stations, access points (APs), gateways, bridges, hubs and routers. Further, the radio systems within the scope of the invention may include cellular radiotelephone systems, satellite systems, personal communication systems (PCS), two-way radio systems and two-way pagers as well as computing devices including radio systems such as personal computers (PCs) and related peripherals, personal digital assistants (PDAs), personal computing accessories and all existing and future arising systems which may be related in nature and to which the principles of the inventive embodiments could be suitably applied.

Figure 1:
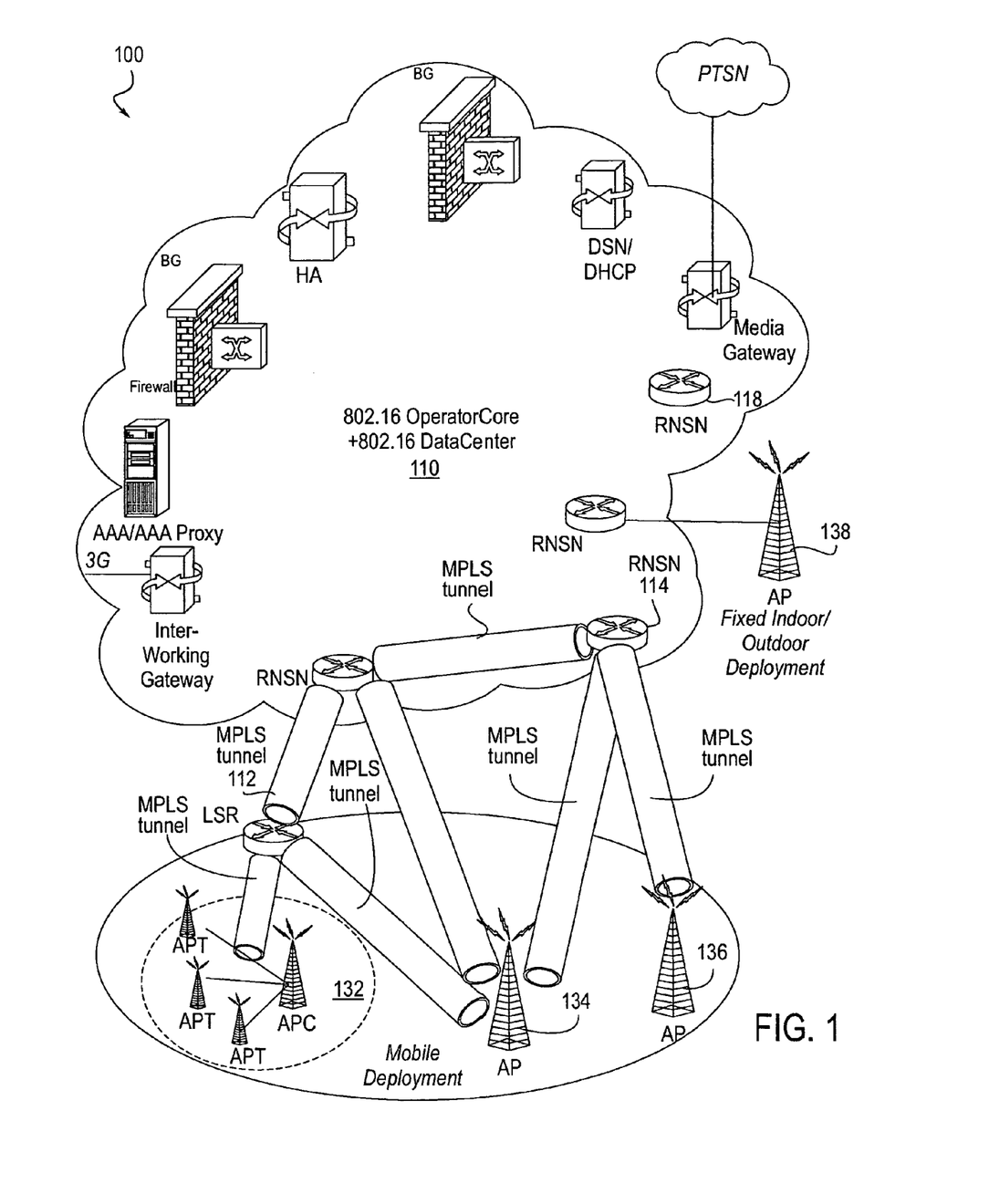
FIG. 1 is block diagram of a wireless network according to one example implementation for various embodiments of the present invention.

Turning to FIG. 1, a wireless communication network 100 according to various inventive embodiments may be any wireless system capable of supporting network access to various subscribers including mobile subscribers. For example in one embodiment, network 100 may be a wireless broadband network such as those contemplated by various 802.16 standards specified by the Institute of Electrical and Electronics Engineers (IEEE) for fixed and mobile subscribers, although the inventive embodiments are not limited in this respect.

In one embodiment, network 100 may include a core network 110 and two or more network access stations 132, 134, 136, 138 facilitating connection between fixed and/or mobile subscriber stations (not shown) and core network 110.

Core network 110 may include various wired and/or wireless devices (e.g. including hardware and/or software) which enable subscribers to communicate with other subscribers, servers and/or various other host networks such as a cellular network (e.g., 3G cellular), public switched telephone network (PSTN) and/or packet switched networks such as wired or wireless Internet Protocol networks. In one embodiment, core network 110 may include one or more service nodes 112-118 (referred to in non-limiting embodiments below as radio network service nodes (RNSNs)) to interface network access stations 132, 134, 136, 138 with core network 110.

Network access stations 132, 134, 136, 138 (also referred to in non-limiting example embodiments herein as access points (APs) or base stations) may be any component or combination of components for providing over-the-air (OTA) link access between core network 110 and the subscriber stations. In certain embodiments, APs 132, 134, 136, 138 may communicate with subscribers using orthogonal frequency division multiplexing (OFDM) and/or orthogonal frequency division multiple access (OFDMA) modulation techniques although the inventive embodiments are not limited in this respect.

To help achieve minimum service levels, core network 110 may be configured to communicate with APs 132, 134, 136, 138 using multi-protocol label switching (MPLS). MPLS is an Internet Engineering Task Force (IETF) initiative that integrates Layer 2 information about network links (e.g., bandwidth, latency, utilization) into Layer 3 (IP) within a particular autonomous system—or Internet service provider (ISP)—in order to simplify and improve IP-packet exchange. When packets enter a MPLS-based network, Label Edge Routers (LERs) give them a label (identifier). These labels may not only contain information based on the routing table entry (e.g., destination, bandwidth, delay, and other metrics), but also may refer to the IP header field (source IP address), Layer 4 socket number information, and/or differentiated levels of service. Once this classification is complete and mapped, different packets may be assigned to corresponding Labeled Switch Paths (LSPs) or tunnels, where Label Switch Routers (LSRs) place outgoing labels on the packets.

APs 132, 134, 136, 138 may be stand alone units having traditional base station architectures or can be implemented using a combination of architectures such as an access point controller (APC) in conjunction with one or more separate access point transceivers (APTs) (e.g., AP 132 as shown in FIG. 1), or as an IP router with a mobility agent (e.g., Mobile IPv4 foreign agent (MIPv4FA)) co-located. In one embodiment, APs 132, 134, 136 may comprise an 802.16 compatible base station in addition to a LER. Further, each RNSN may include a MIP foreign agent plus other services as needed, for example, an 802.16 Paging Group coordination point. As depicted in FIG. 1, LERs in network 100 may be integrated with the APs and/or RNSNs and are thus not separately shown. Further, there may be on Accordingly, pre-provisioned MPLS tunnels may be used to provide QoS-aware traffic-engineered paths between the APs and RNSNs of network 100 as shown in FIG. 1.

For mobile deployment situations, APs 132, 134, 136 may be geographically arranged to provide overlapping radio frequency (RF) link coverage to a mobile subscriber station (e.g., MSS) as it moves through the various regions covered by network 100.

An MSS moving between geographic regions in network 100, for example between a region covered by AP 132 and a region covered by AP 134, may require a physical (PHY) link handover between its presently serving AP (e.g., AP 132) and an AP more proximate to the region into which the MSS is moving (e.g., target AP 134). A significant constraint on the handover may be the time delay (or latency) experienced in completing the PHY layer handover. According to the various inventive embodiments herein, the handover may occur without significant delay (i.e., latency) and/or without significant packet loss. Even in the case where the PHY layer handoff experiences some latency, the Layer 3 session may not be interrupted; that is, for example, the IP connections between an MSS and its correspondent host will continue.

Figure 2:
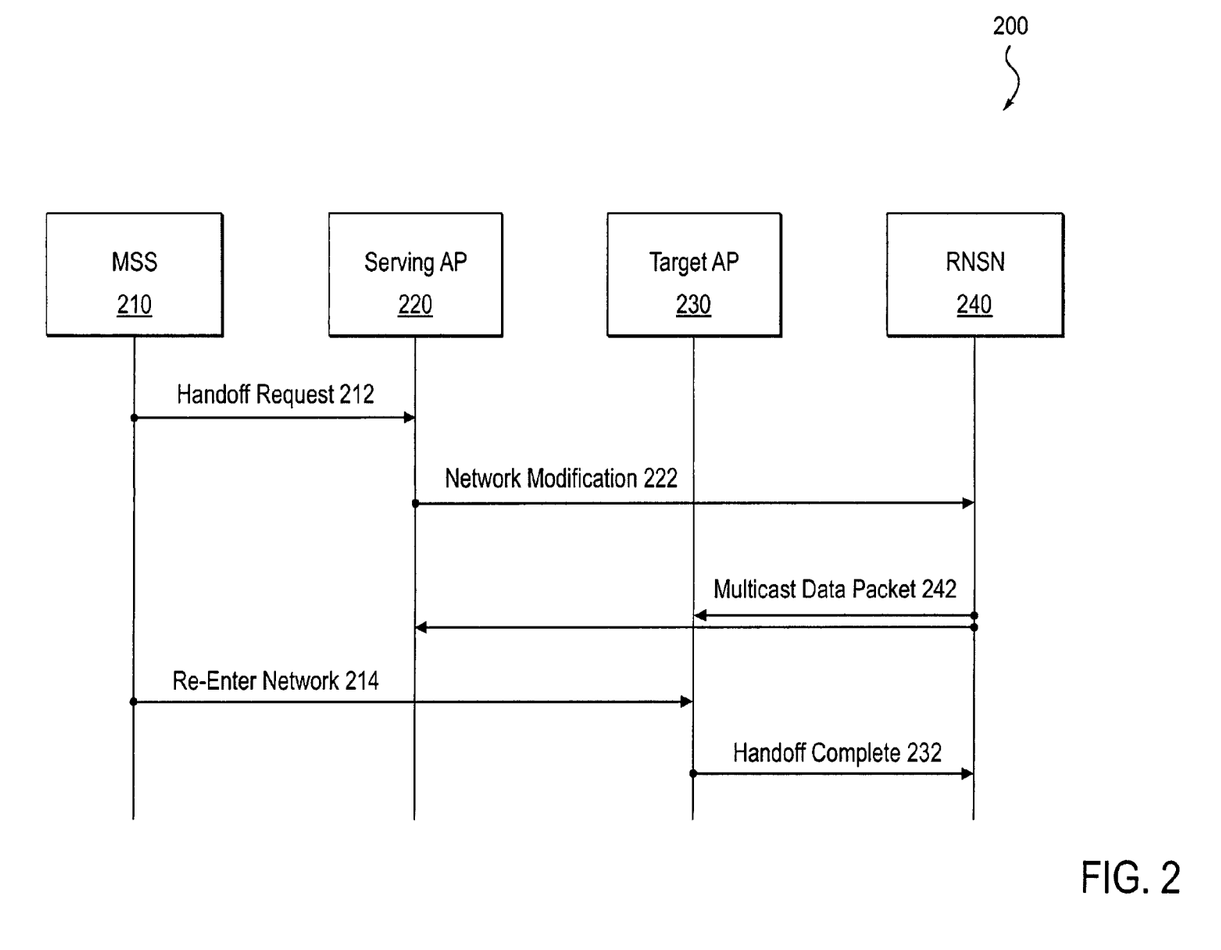
FIG. 2 is a message sequence diagram showing a mobile handover process according to one embodiment of the present invention.

Turning to FIG. 2, a method 200 for mobile handover in an MPLS based network may generally include multicasting 242 packets from the RNSN 240 that controls the AP currently serving the MSS (e.g., serving AP 220) to both the serving AP 220 and the one or more APs to which the MSS may handoff to (i.e., target AP(s) 230). If the target AP(s) 230 is(are) not connected to the serving RNSN 240 of the serving AP 220, then the multicast traffic may be routed through an RNSN(s) that serves the target AP(s) as discussed further below in reference to FIG. 3.

In one embodiment, the multicast 242 may be initiated by a L2 trigger sent by the MSS 210 although, the serving AP 220 or other network entity may alternatively initiate and/or indicate the need for handoff. Multicasting 242 makes packets available to all target APs 240 to which the MSS 210 will possibly connect to during handover, thus allowing packets to get to the MSS 210 no matter where it is connected, and without significant interruption or delay in packet flow.

As used herein the following terms are intended to have the following definitions. A "Layer 2 trigger" (or L2 trigger) is a Layer 2 message from the MSS (e.g. a MAC message such as MOB-HO-IND, or MOB-MSSHO-REQ) that indicates the MSS is contemplating or is ready to initiate a handover.

"Multicasting" or a "multicast" may mean either a true multicast in which a multicast group is pre-established and used, or it may be a multi-unicast (including bi-cast) in which a router simply duplicates packets on each of two or more unicast flows. The "serving AP" is the AP to which the MSS is connected at the beginning of the handover. The "target AP" is the one or more APs to which the MSS may be connected at the end of the handover. As there may be multiple target APs, the number of legs of the multicast may be indeterminate. The potential indeterminate nature of the target APs means that pre-provisioning multicast groups might create difficulties, which is why one might wish to simply multi-unicast rather than use true multicast. For example, the time needed to dynamically set up and tear down multicast groups might exceed the time required for handovers to occur, which may be, for example, a few tens of milliseconds.

With the inventive embodiments for mobile handoff discussed herein, the handover may be nearly lossless because no (or very few) packets are lost during handover. The handover is considered to experience low-latency because the multicast is set up before the actual handover occurs, and thus packets are sent ahead of the MSS so that the packets are there when it connects to a target AP.

In one embodiment, an L2 or other type of trigger message may be sent 212 by MSS 210 to Serving AP 220 to indicate its desire to hand off. The trigger message may include a designator or name for each target AP 230 to which MSS 210 may connect to, although the inventive embodiments are not limited in this respect. The serving AP 220 may then notify 222 the RNSN 240, for example via a specific message or through signaling or control bits, of the impending handover including the potential target APs 230. In other embodiments, RNSN 240 may be notified of impending handover directly by MSS 210 (e.g., without interaction from serving AP 220) or by serving AP 220 without interaction or messages from MSS 210.

RNSN 240 or other network entity may also determine whether an Inter-RNSN Handover procedure is necessary (Inter-RNSN handover is discussed below in reference to FIG. 3).

RNSN 240 then multicasts 242, or in the case of a single target AP bi-casts, the packets for MSS 210 to both serving AP 220 and target AP 230, thus maintaining its original flow to serving AP 220 while simultaneously or nearly simultaneously forwarding the same (e.g., duplicated packets) to all target APs.

When MSS 210 re-enters 214 the network by connecting to target AP 230, RNSN 240 may be informed 232 that the handover is complete, for example, by target AP 230 (which now becomes the serving AP) sending a "Handoff Complete" message or other indicator to RNSN 240. RNSN 240 may modify the MSS's binding relationship from serving AP 220 to target AP 230 in, for example, a classifier lookup table maintained by RNSN 240.

The multicast approach is suited well for the case where there is multiple potential target APs, as does the actual 802.16e message MOB-MSSHO-REQ. For example, assuming that the initial handoff request might be in the form of a MOB-MSSHO-REQ message, then it is quite possible (and indeed it is expected although not required) for there to be a subsequent request, for example, in the form of a MOB-HO-IND, which may indicate only a single target AP. Accordingly, it possible for there to be a subsequent network modification message 222 from serving AP 220 to RNSN 240 indicating that second change, after which RNSN 240 might update its classifier table to only forward packets to serving AP 220 and the (now single) target AP 230. Thus the messaging sequences shown in FIGS. 2 and 3 may include additional messaging (not shown) and is not intended to limit the inventive embodiments to any particular implementation or optimization.

During multicasting to target APs 230, it my be desirable to buffer packets received at target AP 230 until either MSS 210 connects to target AP 230 or MSS 210 connects to another target AP. The techniques for buffering these packets may be implementation specific considering, for example, the acceptable potential loss of packets, buffering capacity in the network nodes and the de-optimization factor of having too many duplicate packets. In various embodiments a buffering policy for buffering at the target APs may be used to handle what is to be done with packets coming from an RNSN that are destined for an MSS but which the target AP is not aware. Some possible considerations are discussed below.

Assuming that the time it takes a packet to get from the RNSN to a target AP is defined as its "transit time" and the time that it takes the MSS to physically disconnect and reconnect is defined as the "disconnect time". If the target AP is configured to drop packets destined for an "unknown" MSS which arrived as a result of the multicasting by an RNSN, when the transit time is less than the disconnect time, then there may be packet loss.

Alternatively, the target AP might buffer these packets for a period of time as mentioned above. However, the question how long to buffer these packets becomes a consideration. For example, if the buffering time is too short, it may be analogous to dropping packets which may result in packet loss as mentioned previously. By way of contrast, if buffering time is too long, then three things could potentially occur: (i) the target AP runs out of buffering capacity; (ii) the target AP may be buffering packets already been received by the MSS (thus when they are sent after the MSS reconnects there may be a lot of duplicates); and (iii) real-time packets may be stale (a real-time packet is one that must get to the destination in reasonable time, or else it is not useful, for example, a voice over IP (VoIP) packet must reach the destination in time to be used in the conversation when it is needed).

Accordingly, in preferred implementations, the target AP will be configured to buffer these packets for a while, but not too long. The amount of buffering time might thus be a parameter that is provisioned and changeable, for example, on a slowly varying basis. In one embodiment, the buffering time may be set to be a threshold value greater than the average disconnect time. A target value for this parameter might be set, for example, three standard deviations above the mean of the disconnect time. This would provide some duplicate packets but also relatively lossless handover to the vast majority of MSS's. The buffering time may be adjusted by various implementation algorithms (for example, at the discretion of a network architect or management program) to optimize desired performance.

An alternative approach may be the use of heuristic buffering. For heuristic buffering, the RNSN may use a protocol with each AP to enable them to be aware of the received state of each packet at the MSS. For example, the RNSN may be configured to add an additional header or signaling to each packet, which contains a sequence number. Further the RNSN may do header compression, e.g. robust header compression (ROHC), at the same time to increase the efficiency of the access network. Additional protocol messages such as use of acknowledgments (ACKs), could enable an RNSN to know that each packet has made it to the MSS.

Using this approach, an RNSN rather than the target APs, could buffer most of the packets (again using some buffering policy) because the RNSN is often a stateful and high-end network box capable of doing more complex procedures, such as looking into real-time protocol packets and dropping those that were stale, and preferentially dropping TCP packets since they could be retransmitted, should it become necessary. The RNSN may then send only a few packets at a time to each target AP with those few packets being the next ones which the MSS would most likely need as soon as it reconnected. This approach can be guaranteed lossless (to the extent allowed by the disconnect time), and is highly efficient, but more complex. This approach may further require a reliable multicast protocol from the RNSN to the APs with some additional control messages that allow, for example, the RNSN to inform the other AP(s) that the MSS has connected somewhere else and that they may drop all the packets previously sent, or that the MSS is still communicating with the serving AP so the target AP(s) may drop the first N packets that had already been sent.

Figure 3:
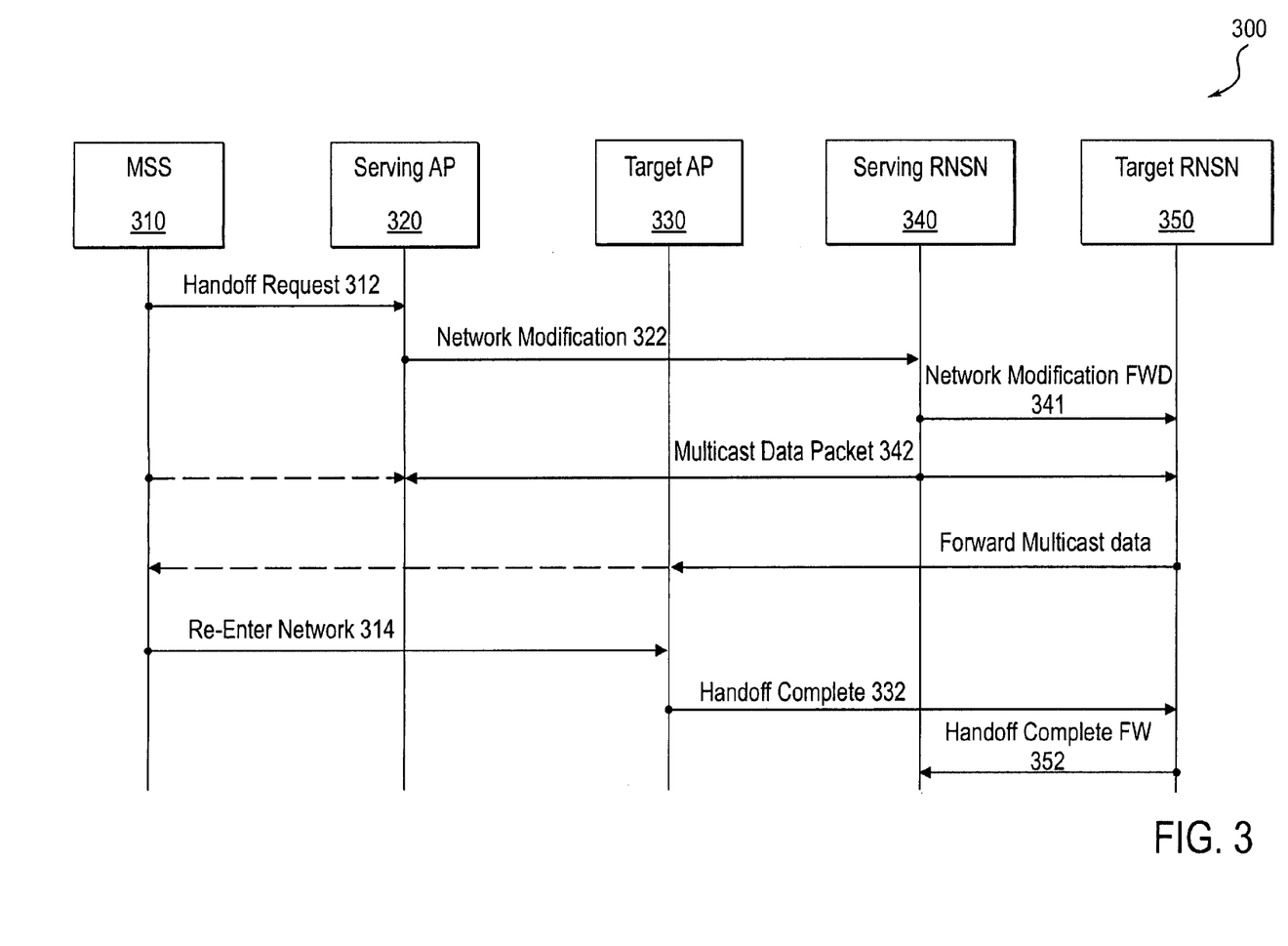
FIG. 3 is a message sequence diagram showing a mobile handover process according to another embodiment of the present invention.

Turning to FIG. 3, a method 300 for communicating in a wireless network with inter-RNSN handoff is similar to that discussed in respect to FIG. 2. Thus similar reference designations are intended to denote similar events/equipment and only those additional differences will be discussed in detail. The inter-RNSN handoff procedure 300 may be used when it is determined that one or more of the target APs 330, for example, specified in the handoff request 312, does not have a direct MPLS path established with the RNSN (serving RNSN 340) servicing the AP 320 that is currently serving the MSS 310. This can be observed in the previous example of FIG. 1, by AP 136 which does not have a MPLS tunnel established directly with RNSN 112.

Accordingly, when the serving AP 320 notifies 322 the serving RNSN 340 of the impending handover, the serving RNSN 340 may determine whether an inter-RNSN Handover procedure is necessary. If it is an intra-RNSN handover, then the procedure described in reference to FIG. 2 may be used. If serving RNSN 340 determines that it is an inter-RNSN handoff, a network modification message (preferably although not required, with MSS and target APs as input parameters) is forwarded 341 to the target RNSN 350, which is an RNSN that is servicing the target AP 330. A binding relationship of MSS and APs may be created on target RNSN 350.

The packets destined for MSS 310 may now be sent 342 by serving RNSN 340 to both serving AP 320 and to target RNSN 350 (via, for example, MPLS tunnels between serving RNSN 340 and target RNSN 350). Target RNSN 350 may then forward these packets to target AP 330. Consequently, both serving AP 320 and target AP 330 may receive the packets for MSS substantially simultaneously even though the respective APs are associated with different RNSNs.

If the handover trigger indicated multiple possible Target APs, including some associated with serving RNSN 340 and some associated with target RNSN 340, it is possible that either or both the serving and target RNSNs 340, 350 could multicast or multi-unicast to the various target APs 330. As before, buffering of the packets by the RNSNs and/or target APs is implementation specific and may be done, if at all, in a variety of ways.

When MSS 310 re-enters 314 the network at the target AP 330, target AP 330 may notify 332 target RNSN 350 (now the serving RNSN) of the network re-entry via, for example, packet signaling or a handoff complete message carrying the MSS ID. In turn, target RNSN 350 may notify 352 serving RNSN 340 of the completed handoff via signaling or messaging, which may include the MSS ID. Notification of the completed handoff 352 may be used to trigger the serving RNSN 330 to free up its MSS contex and stop multicasting.

Figure 4:
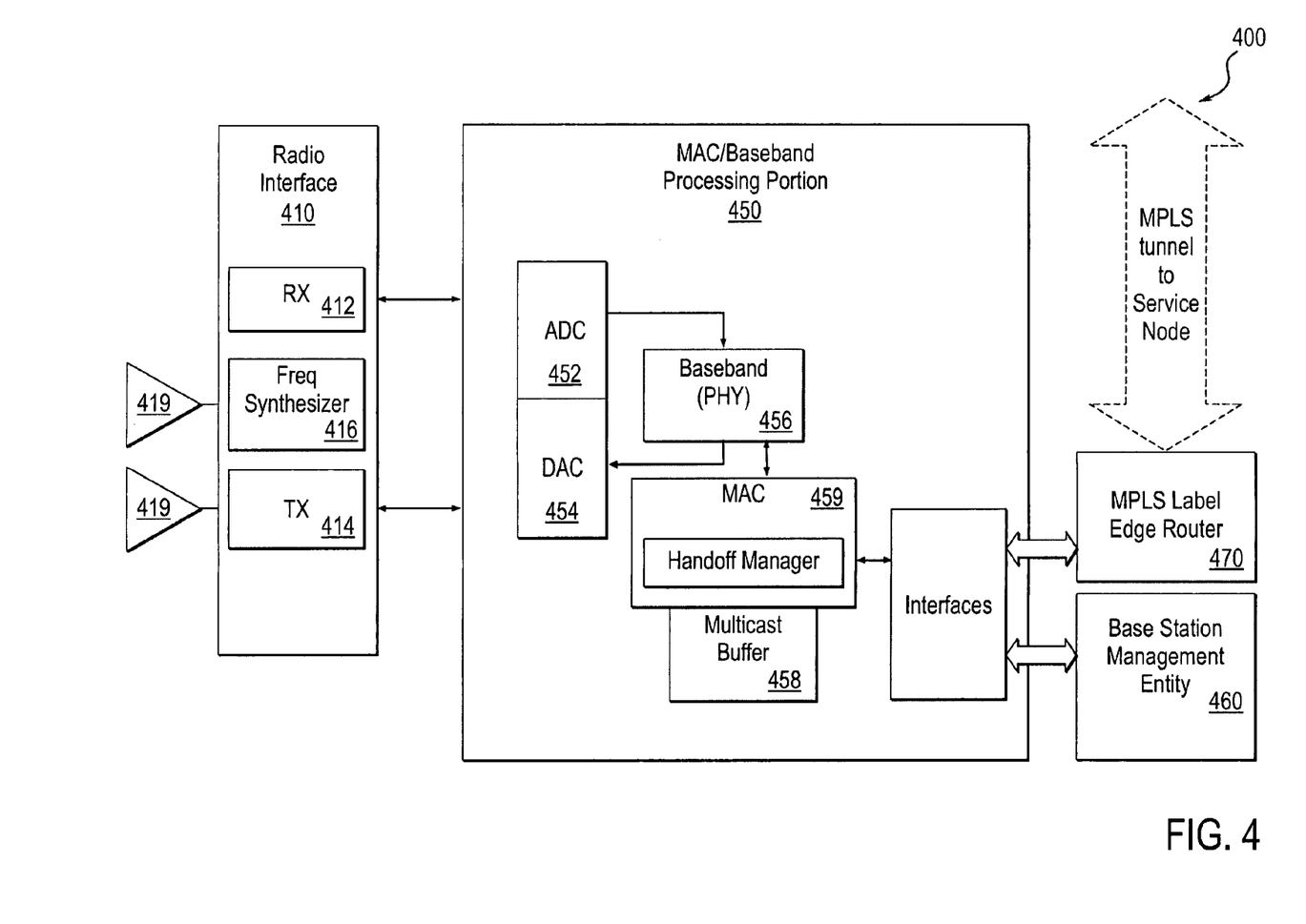
FIG. 4 is a block diagram showing an example network access station apparatus according to various aspects of the invention.

Referring to FIG. 4, an apparatus 400 for use in a wireless network may include a processing circuit 450 including logic (e.g., circuitry, processor and software, or combination thereof) to process received handoff requests, generate network modification messages and/or buffer packets destined for a MSS during handoff as described in one or more of the processes above. In certain embodiments, apparatus 400 may generally include a radio frequency (RF) interface 410 and a baseband and medium access controller (MAC) processor portion 450.

In one example embodiment, RF interface 410 may be any component or combination of components adapted to send and receive multi-carrier modulated signals (e.g., OFDM) although the inventive embodiments are not limited to any particular modulation scheme. RF interface 410 may include, for example, a receiver 412, a transmitter 414 and a frequency synthesizer 416. Interface 410 may also include bias controls, a crystal oscillator and/or one or more antennas 418, 419 if desired. Furthermore, RF interface 510 may alternatively or additionally use external voltage-controlled oscillators (VCOs), surface acoustic wave filters, intermediate frequency (IF) filters and/or radio frequency (RF) filters as desired. Various RF interface designs and their operation are known in the art and the description thereof is therefore omitted.

In some embodiments interface 410 may be configured to be compatible with one or more of the IEEE 802.16 standards contemplated for broadband wireless networks, although the embodiments are not limited in this respect.

Processing portion 450 may communicate with RF interface 410 to process receive/transmit signals and may include, by way of example only, an analog-to-digital converter 452 for down converting received signals, a digital-to-analog converter 454 for up converting signals for transmission, and a baseband processor 456 for physical (PHY) link layer processing of respective receive/transmit signals. Processing portion 450 may also include or be comprised of a processing circuit 459 for medium access control (MAC)/data link layer processing.

In certain embodiments of the present invention, MAC processing circuit 459 may include a handoff manager feature which, in combination with additional circuitry such as buffer memory 458, may function to process and generate handoff messaging and/or buffer multicast packets as described previously. Alternatively or in addition, baseband processing circuit 456 may share processing for certain of these functions or perform these processes independent of MAC processing circuit 459. MAC and PHY processing may also be integrated into a single circuit if desired. Apparatus 400 may also include, or interface with, a station management entity 460 which may control or assist in control/tracking of mobile handoffs, quality of service (QoS) attributes and/or other features. Additionally apparatus 400 may include or interface with a MPLS label edge router 470 or other MPLS device to facilitate MPLS tunnels with service nodes such as the RNSNs previously discussed.

Apparatus 400 may be, for example, a wireless base station or AP, wireless router and/or network adaptor for computing devices. Accordingly, the previously described functions and/or specific configurations of apparatus 400 could be included or omitted as suitably desired.

Embodiments of apparatus 400 may be implemented using single input single output (SISO) architectures. However, as shown in FIG. 4, certain preferred implementations may use multiple input multiple output (MIMO) architectures having multiple antennas (e.g., 418, 419) for transmission and/or reception. Further, embodiments of the invention may utilize multi-carrier code division multiplexing (MC-CDMA) multi-carrier direct sequence code division multiplexing (MC-DS-CDMA) for OTA link access or any other existing or future arising modulation or multiplexing scheme compatible with the features of the inventive embodiments.

Figure 5:
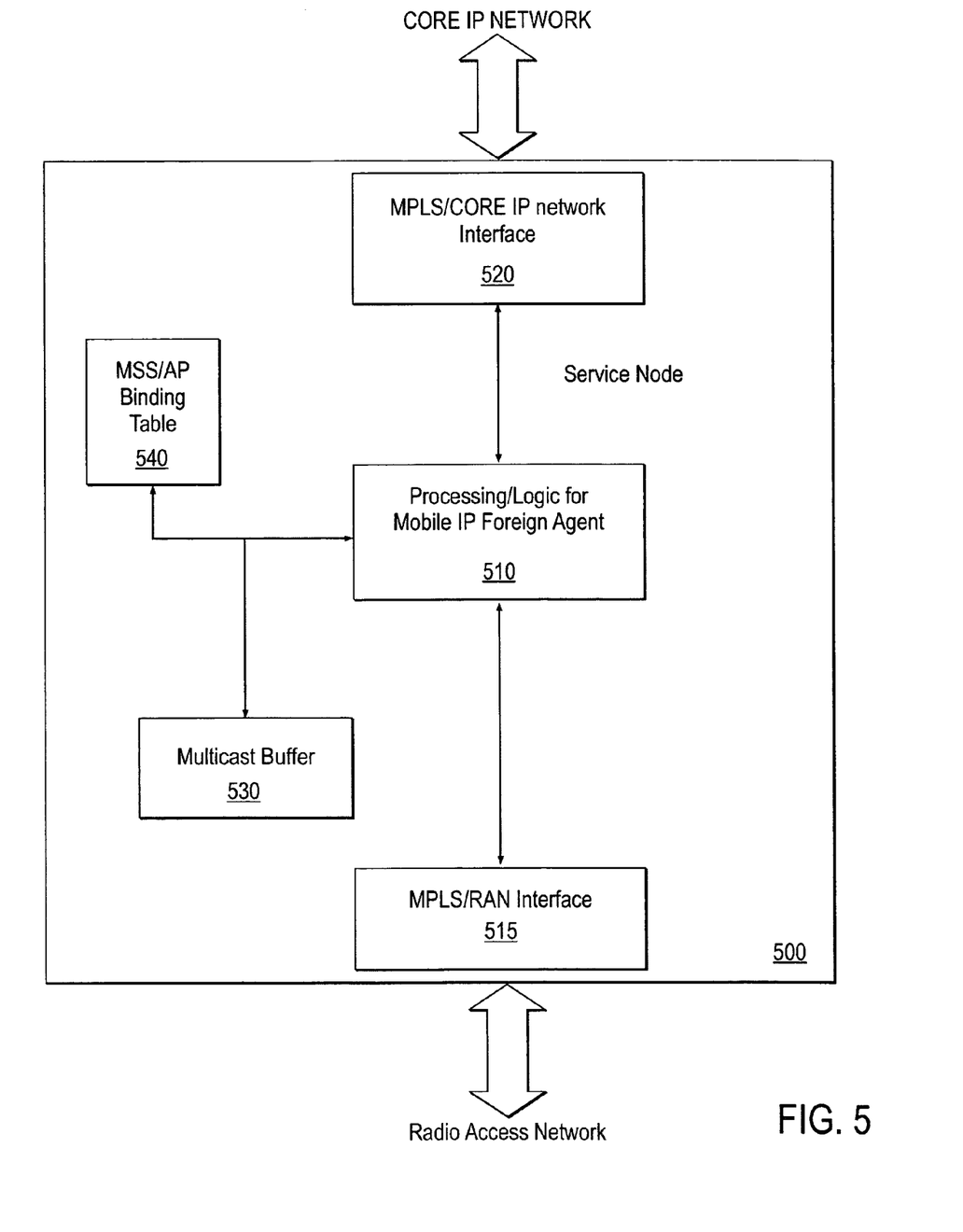
FIG. 5 is a block diagram showing an example network service node according to various aspects of the present invention.

Turning to FIG. 5, an example embodiment of a network service node 500 for use in an MPLS-based network supporting mobile station deployment may be any logical network entity including circuitry and/or processing logic 510 and/or interfaces 515, 520 for interfacing a radio area network (RAN) with the operator IP core network, application service provider (ASP) network, and/or other service networks such as IP multimedia subsystems (IMS), remote enterprise intranets, PSTNs, and the Internet. Logic 510 may be configured to manage a cloud of APs across a hybrid wireline/wireless backhaul network and may be responsible for radio resource management (RRM), data forwarding, and interconnects to back-end networks. Functions such as QoS, mobility and security may also be cooperatively managed as a network of managed APs. Logic 510 may host RAN-specific centralized functions such as paging groups and macro mobility agents, an example of which is a mobile IP (MIP) Foreign Agent (FA) and the like. Node 500 may be rendered on a network infrastructure platform such as a packet data gateway (PDG) in third generation partnership project (3GPP) networks for third generation cellular telephony or packet data serving node (PDSN) in a 3GOO2 network, or as a standalone router platform, although the inventive embodiments are not limited in this respect.

Service node 500 may further include one or more look-up tables 540 or other memory for storing the binding relationships between APs, MSSs and/or other service nodes. Further, depending on the implementation, service node 500 may include one or more memories 530 for buffering MSS packets during mobile handoff as discussed above.

The components and features of apparatus 400 and or service node 500 may be implemented using any combination of discrete circuitry, application specific integrated circuits (ASICs), logic gates and/or single chip architectures. Further, the features of apparatus 400 may be implemented using microcontrollers, programmable logic arrays and/or microprocessors or any combination of the foregoing where suitably appropriate (collectively or individually referred to as "logic").

It should be appreciated that the example apparatus 400 and/or node 500 shown in the block diagrams of respective FIGS. 4 and 5 represent only one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments of the present invention.

Unless contrary to physical possibility, the inventors envision the methods described herein: (i) may be performed in any sequence and/or in any combination; and (ii) the components of respective embodiments may be combined in any manner.

Although there have been described example embodiments of this novel invention, many variations and modifications are possible without departing from the scope of the invention. Accordingly the inventive embodiments are not limited by the specific disclosure above, but rather should be limited only by the scope of the appended claims and their legal equivalents.

The invention claimed is:

1. A system for wireless communications, the system comprising:
    a base station including a transceiver and a plurality of antennas for multiple input multiple output (MIMO) communications, and further including logic to generate and send a network modification message to a first service node via a first MPLS tunnel in response to receiving a layer 2 handoff request message from a currently connected mobile station; and
    a multi-protocol label switching (MPLS) label edge router (LER) coupled to the base station, wherein the base station includes a memory to temporarily buffer packets destined for a mobile station not having current radio link access with the base station;

wherein the network modification message is to be used by the first service node to multicast packets to the base station and to one or more target base stations identified in the layer 2 handoff request message.

2. The system of claim 1 wherein the first service node is to provide access between a radio access network (RAN) and an Internet Protocol (IP) network.

3. The system of claim 1 wherein the first service node further includes logic to dynamically establish one or more additional MPLS tunnels with one or more additional service nodes in order to send the packets to the one or more target base stations.

4. A method for wireless communications, the method comprising:

sending a network modification message from a base station to a first service node via a first MPLS tunnel in response to receiving a layer 2 handoff request message from a currently connected mobile station; and temporarily buffering packets in a memory, the packets destined for a mobile station not having current radio link access with the base station; and multicasting packets to the base station and to one or more target base stations identified in the layer 2 handoff request message.

5. The method of claim 4 wherein the first service node comprises a radio network service node (RNSN) coupled to one or more Internet protocol(IP) networks.

6. The method of claim 4, further comprising sending a handoff trigger message from a mobile station to the base station including an identification of the one or more target base stations.

7. The method 4, further comprising providing access between a radio access network (RAN) and an Internet Protocol (IP) network.

8. The method of claim 4, further comprising dynamically establishing one or more additional MPLS tunnels with one or more additional service nodes in order to send the packets to the one or more target base stations.

* * * * *

UNITED STATES PATENT AND TRADEMARK OFFICE
CERTIFICATE OF CORRECTION

| | | |
|---|---|---|
| PATENT NO. | : 7,668,139 B2 | Page 1 of 1 |
| APPLICATION NO. | : 11/088142 | |
| DATED | : February 23, 2010 | |
| INVENTOR(S) | : Mitchel et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1115 days.

Signed and Sealed this

Twenty-eighth Day of December, 2010

David J. Kappos
*Director of the United States Patent and Trademark Office*